United States Patent
Manoselvam (10) Patent No.: US 11,368,478 B2
(45) Date of Patent: Jun. 21, 2022

(54) SYSTEM FOR DETECTING AND PREVENTING MALWARE EXECUTION IN A TARGET SYSTEM

(71) Applicant: Accenture Global Solutions Limited, Dublin (IE)

(72) Inventor: Vicknesh Manoselvam, Singapore (SG)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 350 days.

(21) Appl. No.: 16/782,817

(22) Filed: Feb. 5, 2020

(65) Prior Publication Data
US 2020/0259851 A1 Aug. 13, 2020

(30) Foreign Application Priority Data
Feb. 8, 2019 (SG) .............................. 10201901110R (51) Int. Cl.
*H04L 9/40* (2022.01)
*G06F 21/56* (2013.01)
(Continued)

(52) U.S. Cl.
CPC ........ *H04L 63/1425* (2013.01); *G06F 21/566* (2013.01); *G06N 3/08* (2013.01);
(Continued)

(58) Field of Classification Search
CPC .......... H04L 63/1425; H04L 61/1511; H04L 63/1416; H04L 63/1441; G06N 20/00; G06N 3/08
(Continued)

(56) References Cited

U.S. PATENT DOCUMENTS 10,154,051 B2 * 12/2018 Sofka .................... G06N 3/0454
10,574,681 B2 * 2/2020 Meshi .................... G06N 20/00
(Continued)

FOREIGN PATENT DOCUMENTS

WO WO-2018164701 A1 * 9/2018 ............. G06N 20/20

OTHER PUBLICATIONS

Extended European Search Report for corresponding application No. EP 20155946.5 dated Apr. 28, 2020, 11 pages.
(Continued)

*Primary Examiner* — Dereena T Cattungal
(74) *Attorney, Agent, or Firm* — Crowell & Moring LLP (57) ABSTRACT

A system for detecting and preventing execution of malware on a target system includes an interface for receiving training data. The training data includes domain names known to be legitimate and domain names known to be associated with malware. The system is configured to train a first model to classify the domain names in the training data as being legitimate domain names or malware-associated domain names using a supervised learning methodology. The system configured to train a second model to predict a correct domain name associated with domain names in the training data using an unsupervised learning methodology. The system configured to train a third model to classify the domain names in the training data as being legitimate domain names or malware-associated domain names based on an output of the first learning model and an output of the second learning model.

16 Claims, 7 Drawing Sheets

(51) Int. Cl.
*G06N 3/08* (2006.01)
*H04L 61/4511* (2022.01)
*G06N 20/00* (2019.01)

(52) U.S. Cl.
CPC .......... *G06N 20/00* (2019.01); *H04L 61/1511* (2013.01); *H04L 63/1416* (2013.01); *H04L 63/1441* (2013.01)

(58) Field of Classification Search
USPC ........................................................ 726/24
See application file for complete search history.

(56) References Cited

U.S. PATENT DOCUMENTS

| | | | |
|---|---|---|---|
| 10,965,697 B2* | 3/2021 | Manadhata | G06F 40/10 |
| 11,005,865 B2* | 5/2021 | Compton | H04L 63/102 |
| 2016/0065597 A1* | 3/2016 | Nguyen | H04L 61/1511 |
| | | | 726/22 |
| 2017/0099319 A1* | 4/2017 | Hunt | H04L 63/0876 |
| 2018/0219887 A1* | 8/2018 | Luo | H04L 63/14 |
| 2020/0304540 A1* | 9/2020 | Chang | H04L 63/1425 |

OTHER PUBLICATIONS

Anderson, Hyrum S. et al., "DeepDGA: Adversarially-Tuned Domain Generation and Detection", ACM, Oct. 28, 2016, pp. 13-21, Vienna, Austria. XP058300460.

* cited by examiner

SYSTEM FOR DETECTING AND PREVENTING MALWARE EXECUTION IN A TARGET SYSTEM

PRIORITY CLAIM

This application claims priority to Singapore patent application serial number 10201901110R, filed Feb. 8, 2019, which is entirely incorporated by reference.

BACKGROUND

Field

This application generally relates to enterprise system security. In particular, this application describes a method and system for detecting malware on computer systems of the enterprise and for preventing execution of the malware.

Description of Related Art

Small and large computer systems may become infected with malware. Often times, the presence of the malware goes unnoticed until, for example, a ransom is received, computers become locked, etc. Such an attack may result in loss of intellectual property, lost productivity, lost revenue, and in some cases necessitate repair/replacement of components of the computer systems.

SUMMARY

A system for detecting and preventing execution of malware on a target system includes an interface for receiving training data. The training data includes domain names known to be legitimate and domain names known to be associated with malware. The system includes a processor in communication with the interface; and non-transitory computer readable media in communication with the processor that stores instruction code. The instruction code is executed by the processor and causes the processor to train a first model to classify the domain names in the training data as being legitimate domain names or malware-associated domain names using a supervised learning methodology. The processor trains a second model to predict a correct domain name associated with domain names in the training data using an unsupervised learning methodology. The processor trains a third model to classify the domain names in the training data as being legitimate domain names or malware-associated domain names based on an output of the first learning model and the second learning model. Subsequent to training of the first, second, and third models, the processor receive a new domain name and processes the new domain name through the trained models to determine whether the domain name is considered to be a legitimate domain name or a malware-associated domain name. The processor communicates a report to the target system based on the processing to thereby facilitate removal of the malware from the target system.

DETAILED DESCRIPTION

The embodiments described below overcome the problems described above by providing a system that utilizes machine learning algorithms to continuously monitor domain name logs generated by an enterprise system for the presence of malware related domain names. The system proactively alerts an operator of the enterprise system of the possibility that a given domain name is associated with malware. This allows the operator of the target system to address potential malware attacks in a way that minimizes or eliminates unplanned downtime and any loss of revenue incurred as a result.

Figure 1:
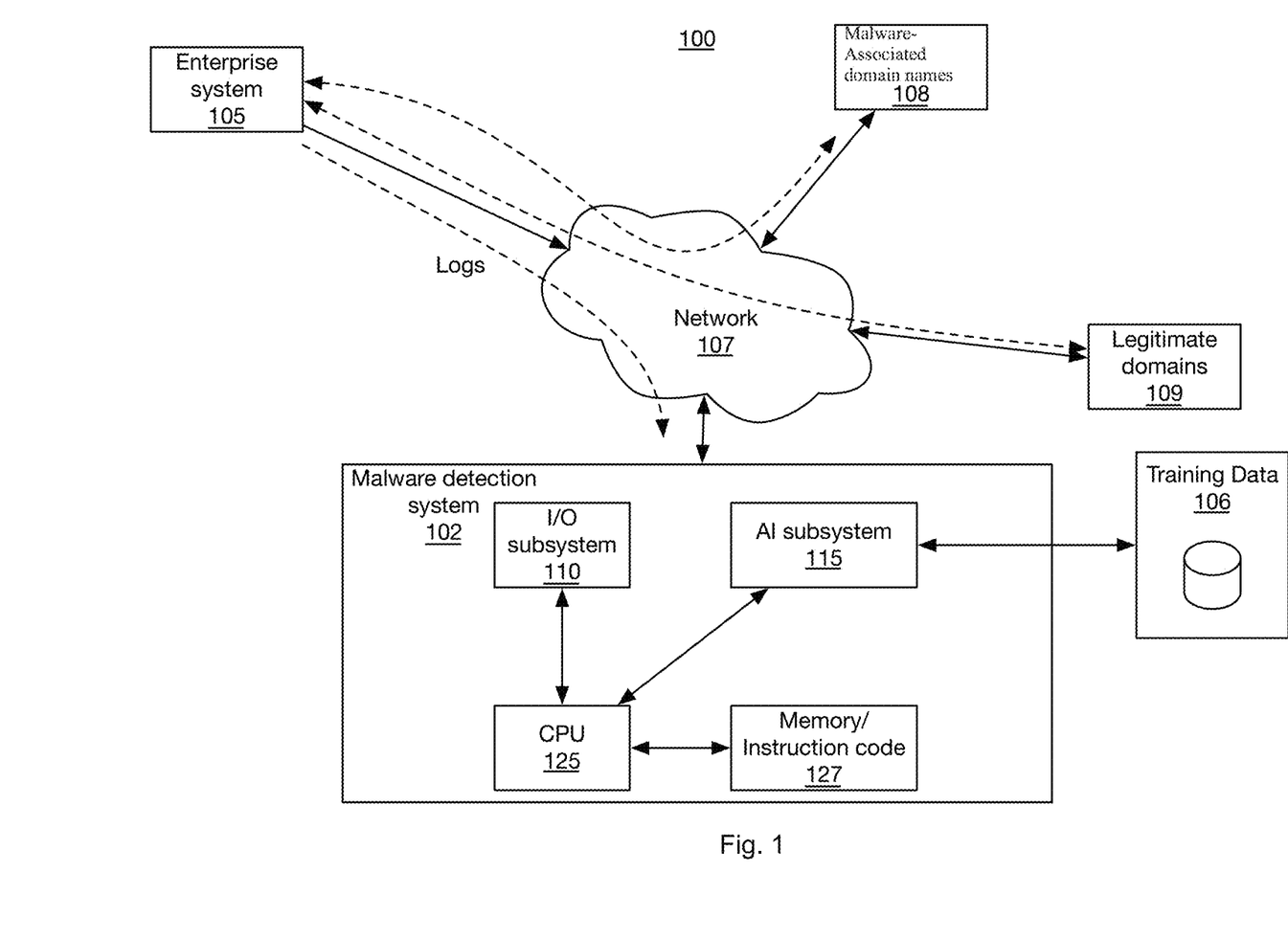
FIG. 1 illustrates an exemplary environment in which a malware detection system (MDS) for detecting and preventing execution of malware in a target system operates.

FIG. 1 illustrates an exemplary environment 100 that includes various systems/entities/devices that facilitate detecting and preventing execution of malware on a target system. Exemplary systems/entities/devices of the environment 100 include a malware detection system (MDS) 102, a user terminal 104, an enterprise/target system 105, and training data source(s) 106. Other systems/entities of the environment 100 may include malware-associated domains 108 and legitimate domains 109. A domain, or domain name, as discussed herein identifies a network domain and/or may represent a resource, such as an Internet Protocol (IP) resource, such as one or more computers hosting a website, a computer, a website itself, or some other service or entity identified by the domain or domain name accessible over the Internet or another network. Malware refers "malicious software," which is code or instructions that are executable to create undesired and many times disruptive, destructive or otherwise unauthorized functions and activities. Examples include ransomware, spyware, adware, Trojans, worms, nagware and similar unwanted and undesirable applications.

The various entities of the environment 100 may communicate with one another via a network 107, such as the Internet and may correspond to computer systems such as an Intel®, AMD®, or PowerPC® based computer system or a different computer system and can include application specific computer systems. The computer systems may include an operating system, such as Microsoft Windows®, Linux, Unix® or other operating system and one or more terminals. Any terminals described herein may be desktop PCs and/or mobile terminals.

The enterprise system 105 may correspond to a networked group of user computers that connect to an outside network 107, such as via a gateway computer system. Users of the user computers (e.g., such as employees of the enterprise) may utilize services reliant upon the outside network 107 such as web browsers, email applications for sending and receiving email messages, chat programs, etc. Network traffic generated by these services may be routed through a firewall/gateway device of the enterprise system 105. The firewall/gateway device may log the network traffic as network transactions. For example, information in URL requests and responses (e.g., headers, cookies, body of entity) may be logged to facilitate management of network usage and infrastructure of the enterprise system 105.

In an embodiment, logs, such as network transaction logs, may be communicated to the MDS 102. The logs may be communicated in real-time or in batches. In this regard, the enterprise system 105 may be configured to facilitate communicating network transaction logs to the MDS 102 via one or more Application Program Interfaces (APIs) associated with the MDS 102. For example, the enterprise system 105 may be configured to communicate with the MDS 102 via an API such as a webserver API, a SOAP-based web service, a RESTful API, and/or a different type of API.

The malware-associated domains 108 and legitimate domains 109 may be associated with computer systems either setup for legitimate purposes (legitimate domains 109) or nefarious purposes (malware-associated domains 108). Communications between the enterprise system 105 and these domains 108 and 109 may initiate via HTTP get and post requests originating from the enterprise system 105, or via a different communication protocol. For example, the enterprise system 105 and the computer systems associated with the malware-associated domains 108 and legitimate domains 109 may be configured to communicate with one another via an API such as a webserver API, a SOAP-based web service, a RESTful API, and/or a different type of API. Legitimate domains are those domains that operate as authorized or approved by users and conform to generally accept laws, standards or rules for operation on networks such as the Internet, whereas illegitimate domains refer to domains performing unauthorized and/or unapproved operations and otherwise perform unauthorized actions, functions and activities that are not generally accepted standards, rules or laws for operation on networks such as the Internet, usually involving some form or malfeasance.

The requests may specify a domain name that is used to direct the requests to a computer system associated with the domain name. In the case of a malware-associated domain, a response to the request may direct malware operating on an infected computer within the enterprise system 105 to communicate information to the same malware-associated domain or a different malware-associated domain. The malware on the infected computer and a computer system associated with the malware-associated domain may cooperate to continually change domain names to avoid detection. In practice, the domain names used by the malware-associated computer systems may appear as an almost random or unintelligible sequence of characters. This is generally different from legitimate domain names, which are typically logical in nature (e.g., containing the name of a company, a sequence of English words, or the like).

The training data source(s) 106 may correspond to one or more systems that store information that defines lists of legitimate and/or illegitimate (i.e., malware) domain names. For example, the systems may correspond to web systems such as Majestic's® Top Million, Cisco's® Umbrella Top Million, and Amazon's® Alexa Top Sites. Information from the data source(s) 106 may be communicated to the MDS 102 via an API such as a webserver API, a SOAP-based web service, a RESTful API, and/or a different type of API, and aggregated. As will be described further elsewhere, the MDS 102 may aggregate the domain names provided by the different sources to facilitate training artificial intelligence (AI) subsystems of the MDS 102.

The MDS 102 may include circuitry in the form of a processor 125, such as one or more central processing units (CPU), input/output (I/O) subsystem 110, and an AI subsystem 115. The MDS 102 may include other circuitry and subsystems.

It is contemplated that the I/O subsystem 110, AI subsystem 115, and any other subsystem referenced herein may correspond to circuitry such as a stand-alone computer system such as an Intel®, AMD®, or PowerPC® based computer system or a different computer system and can include application specific computer systems. The computer systems may include an operating system, such as Microsoft Windows®, Linux, Unix® or other operating system. It is also contemplated that operations performed on the various subsystems may be combined into a fewer or greater number of subsystems to facilitate speed scaling, cost reductions, and the like.

The I/O subsystem 110 of the MDS 102 includes one or more input, output, or input/output interfaces and is configured to facilitate communication with entities outside of the MDS 102. In this regard, the I/O subsystem 110 may be configured to dynamically determine the communication methodology utilized by entities of the environment 100 and may communicate information to the entities with an interface that uses a determined communication methodology. For example, the I/O subsystem 110 may determine that a first entity utilizes a RESTful API and may, therefore, communicate with the first entity using a communication interface that uses a RESTful communication methodology.

The I/O subsystem 110 may implement a web browser to facilitate generating one or more web-based interfaces through which users of the MDS 102, enterprise system 105, and/or other systems may interact with the MDS 102. The web browser may be displayed on hardware such as a terminal. The web browser may implement a web services interface to facilitate automating some of the web-based functionality via a computer. For example, one or more of the entities of the environment 100 may utilize the web services interfaces to access information stored by the MDS 102 and/or to communicate information to the MDS 102.

The AI subsystem 115 may correspond to hardware specifically configured to perform or assist in the performance of various natural language processing techniques such as latent Dirichlet allocation (LDA) to identify topics associated with conversations, hierarchical density based cluster analysis (H-DBSCAN) to group conversations under one or more topics, Knuth-Morris-Pratt string searching to locate and extract occurrences of a certain words within conversations, possibly linear clustering algorithms to mine text data, and/or other techniques.

The AI subsystem 115 may be further configured to implement various supervised and unsupervised machine learning models. The machine learning models may be based on algorithms such as a Holt-Winters algorithm, an exponential time smoothing (ETS) algorithm, an artificial neural network (ANN), a recurrent neural network (RNN), a seasonal auto regressive moving average (SARIMA) algorithm, a network of long short-term memories (LSTM), and/or a gated recurring unit (GRU) algorithm.

Figure 2:
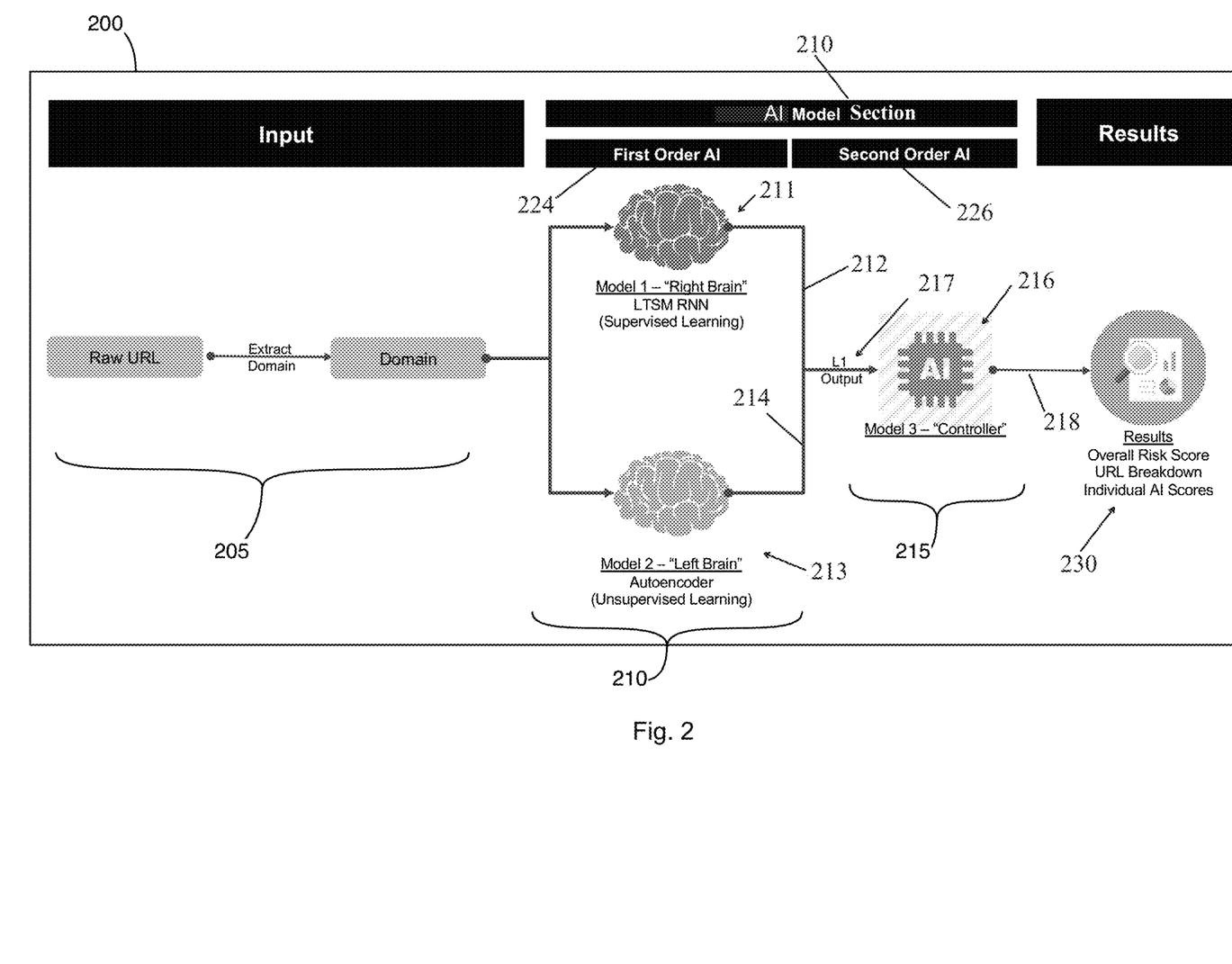
FIG. 2 logically illustrates processing of domain names through a group of models of the MDS to determine whether the domain names are legitimate domain names.

FIG. 2 illustrates exemplary circuitry and logic 200 implemented by the AI subsystem 115. Referring to FIG. 2, input processing section 205 represents circuitry and logic for receiving one or more domain names that may be associated with legitimate domains or malware-associated domains. The domain names may be received as, for example, raw URLs in network messages. The input processing section 205 may process the raw URLs to extract domain names. The domain names may be a sequence or series of characters, such as letters, numbers and symbols, which are repeated each time there is communication to or from the domain. Extraction of the domain names may involve character recognition, natural language processing and other data processing techniques to deconstruct the raw URLs.

In section 210, the received domains are processed through machine learning models circuitry, such as a pair of machine learning models. Each machine learning model may implement so-called deep learning logic (i.e., recurrent neural networks that include several interconnected neural layers.) Such models are given data to ingest and in in some cases told a result to be interpreted from the data (supervised) or are allowed to elicit different categories from the data (unsupervised). The models are trained to arrive at a result based on the ingested data and the quality of the results is dependent in part on the diversity of the data being ingested.

In the example of FIG. 2, a first so-called "right brain" model (first learning model or model 1) 211 may be circuitry utilizing a bi-directional long short-term memory (LSTM) recurrent neural network (RNN), trained using a supervised learning methodology, to classify domain names as being either legitimate domain names or malware-associated domain names based on the sequence of characters in a domain name. That is, the output 212 of the first learning model 211 may be a binary value predictive of the legitimacy of the domain name. In some implementations, the first learning model 211 may generate a confidence score indicative of the confidence the first learning model has in the prediction.

A second so-called "left brain" model (second learning model or model 2) 213 may be circuitry that includes multiple long short-term memory (LSTM) RNNs, trained using an unsupervised learning methodology, to generate a result based on the sequence of characters in a domain name. In examples, a pair of long short-term memory (LSTM) RNNs are sequentially deployed. The implemented second learning model 213 may correspond to an autoencoder that recreates its input(s) accurately according to its training. In this way, the second learning model may deconstruct a series of characters received in a domain name (encoder portion) by recognition of characters within the domain name, and reconstruct a substitute series of characters to generate a predicted domain name (decoder portion) based on its training. The output 214 of the second learning model 213 is a predicted domain name associated with the received domain name. In an example, the second learning model 213 is intentionally trained using only legitimate domains 109 (FIG. 1). Accordingly, accuracy of the domains predicted by the second learning model 213 will be relatively high for legitimate domains due to familiarity with such domains from the training received. Conversely, accuracy of domains predicted for unknown domains, such as malware associated domains 108 (FIG. 1) will be relatively low due to the second learning model's lack of familiarity with such domains.

For example, if the received domain were "www.accenture123.com," the predicted domain may be "www.accenture.com," due to, for example, familiarity with Accenture being a legitimate domain used in training. The second learning model 213 may generate an accuracy confidence score indicative of the confidence that the predicted domain is correct. In an example, the score may be 9 out of 10, where 10 indicates 100% confidence that the result is correct. On the other hand, a domain such as "asd4533ggsw3545.com", which may be an unfamiliar domain due to absence of training using this domain, may be predicted to be "apple.com" and have a confidence score of 1, to indicate that the predicted result is in all likelihood incorrect. The score may be utilized during training of the model using only legitimate domains to optimize high confidence scores for legitimate domains, and low confidence scores for malware associated domains. In other words, any unfamiliar domains passed to the second learning model 213 following training will likely be recreated poorly and have a corresponding relatively low confidence score due to intentional absence of pattern learning during training of any domains other than known legitimate domains.

In section 215, a third learning model 216 receives an L1 output 217 from the first and second learning models 211 and 213. The L1 output 217 may include a binary prediction from the first learning model 211 and the predicted domain name from the second learning model 213. The third learning model 216 may be circuitry that classifies the received domain name as being a legitimate domain name or a malware-associated domain name, and provide the prediction as an output 218. The third learning model 216 may utilize one or more bidirectional long short-term memory recurrent neural networks (a bidirectional LSTM RNN) trained using a supervised methodology. Bidirectional LSTM RNNs operate in future and past time states by operating in both a positive time direction (forward states) and a negative time direction (backward states). The third learning model 216 may also generate and include an accuracy confidence score indicating a degree of accuracy of the designation as legitimate or illegitimate in the output 218.

Sections 210 and 215 together represent an AI model section 220 of the logic 200 having a first order AI section 224 in communication with a second order AI section 226. The first order AI section 224 includes the first learning model (model 1) 211 and the second learning model (model 2) 213, which cooperatively operate to provide the L1 output 217 as a first order AI output. The first order AI output 217 is provided as input logic to the second order AI section 226. The second order AI section 226 may base the classification of the domain name on the input logic. In addition, the second order AI section may receive a confidence score from the first learning model 211, the second learning model 213, or both the first and second learning models 211 and 213. The third learning model 216 may use one or more of the confidence scores as a feed forward weighting during classification of the domain name prediction. For example, if the binary prediction from the first learning model 211 is illegitimate with a relatively low confidence score and the predicted domain name from the second learning model 213 is a relatively high confidence value, the third learning model 216 may determine the domain name is legitimate despite the illegitimate binary prediction from the first learning model 211 due to the training of the second learning model 213 being only with known legitimate domains and therefore being weighted higher by the third learning model 216.

A report that lists domain names and the corresponding prediction result associated with the domain names may be generated by results section circuitry 230. The report may be displayed on a terminal and/or be available as an electronic file, and/or for printing as a paper document. In addition, or alternatively, the results section 230 may communicate this information to the enterprise system 105 to facilitate removal of any detected malware. The results section 230 may generate and transmit the information over a network or other communication path as instructions executable by the enterprise system to remove, quarantine, restrict or otherwise disable detected malware in the enterprise system 105. Alternatively or in addition, circuitry and logic 200 may be employed on an ad hoc basis to evaluate a received domain name as being a legitimate domain name or a malware-associated domain name, and to produce metadata associated with this determination, such as, for example, a risk score, a URL breakdown, and the outputs (scores) from the "right brain" and "left brain" models 211 and 213.

The CPU 125 executes instruction code stored in a memory device 127 for coordinating activities performed between the various subsystems. The processor 125 may correspond to a stand-alone computer system such as an Intel®, AMD®, or PowerPC® based computer system or a different computer system and can include application specific computer systems. The computer systems may include an operating system, such as Microsoft Windows®, Linux, Unix® or other operating system.

FIG. 2 illustrates exemplary operations and functionality performed by the CPU 125 and/or other circuitry of the MDS 102 for training the various machine-learning models in the AI model section 210 in order to detect malware communications between the enterprise system 105 and the malware-associated domains 108. In this regard, the operations may be implemented via instruction code stored in non-transitory computer readable media 127 that resides within one or more of the subsystems configured to cause the respective subsystems to perform the operations illustrated in the figures and discussed herein. The operations of FIG. 2 are best understood with reference to the diagrams of FIGS. 1 and 3-6.

Figure 3:
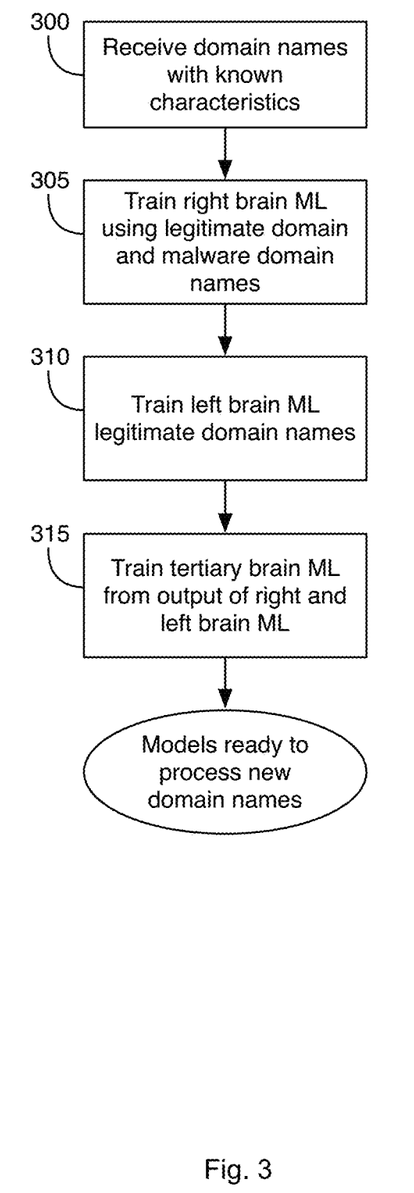
FIG. 3 illustrates operations performed by the MDS for training machine-learning models of the MDS.

Referring to FIG. 3, at operation 300, training data that defines lists of legitimate and/or illegitimate domain names is ingested from the data source(s) 106 to the input processing section 205. In some instances, the ingested data may be pre-processed by the input processing section 205 by performing operations such as deduplication, removal of foreign-language domains, removal of anomalous domains, and the like. For example, a large number of most prevalently used domains from various domain reputation feeds, such as MAJESTIC, CISCO, ALEXA may be downloaded and processed. In an example processing, the extracted domains may be de-duplicated, and then a predetermined percentage, such as the bottom 20% may be eliminated. The extracted top 80% of the domains may be selectively joined, further de-duplicated, and combined to obtain combined domains from the various reputation feeds. In addition, in some examples, foreign language domains and anomalous domains may be removed. Following input processing by the input processing section 205, clean, good domains and malware associated domains may be stored in a database in the malware detection system 102, such as in memory 127.

Figure 4:
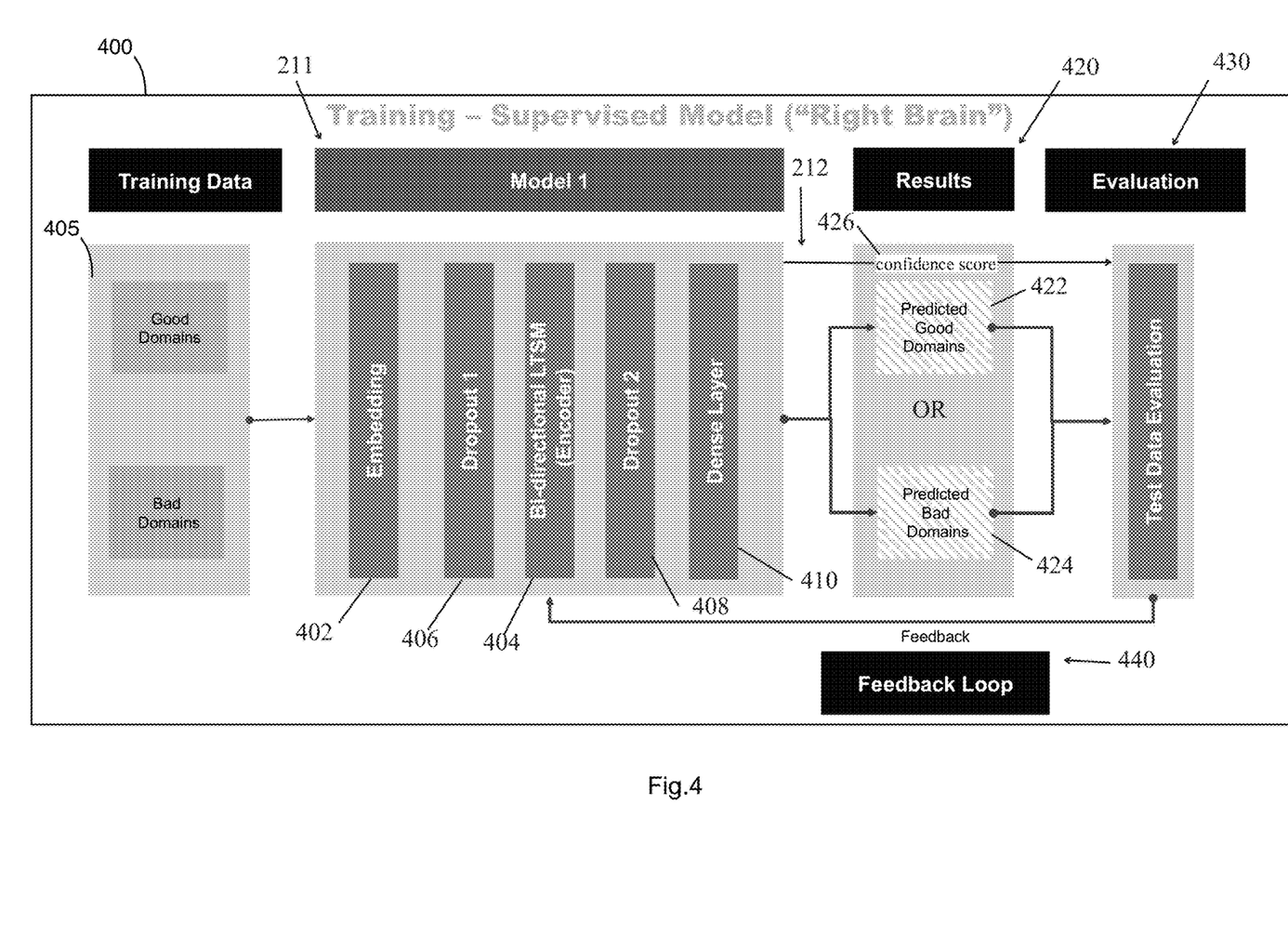
FIG. 4 logically illustrates training of a first model of the MDS.

At operation 305, the first learning model (i.e., right brain) 211 may be trained using a training set of the legitimate (i.e., good) and malware-associated (i.e., bad) domains, such as those stored in the memory 127, as test data. FIG. 4 illustrates exemplary circuitry and logic 400 implemented by the first learning model 211. Referring to FIG. 4, the legitimate (i.e., good) and malware-associated (i.e., bad) domains as test data 405 is provided to the first learning model 211. During training of the first learning model 211, the domains are embedded (i.e., represented as a vector) with embedding circuitry 402 to facilitate processing within bi-directional LSTM encoder circuitry 404. First and second dropout operations are performed by first and second dropout circuitry 406 and 408, respectively, to exclude the activation and weight updates to certain neurons (or nodes) of the model 211 to thereby reduce overfitting and to improve model performance. The dense layer circuitry 410 may perform matrix vector multiplication to generate and change the dimensions of a matrix of trainable parameters. The trainable parameters may be updated during the training by back propagation. The dense layer circuitry 410 may output the binary prediction of the first learning model 211 as predicted good domains indication, such as a "1", or a predicted bad domain indications, such as a "0" for each of the domains analyzed by the first learning model 211.

The first learning model 211 generates results 420 as a binary result (i.e., predicted good domain 422 or predicted bad domain 424). In addition, the model 211 generates a confidence score 426. In examples, the predicted good domain 422 or predicted bad domain 424 and the confidence score 426 may be provided as the output 212 as a three digit value, with the predicted good domain 422 or predicted bad domain 424 being the first digit, and the confidence score being a value from 0-99 represented by the second and third digits. In other examples, signals indicative of the predicted good domain 422 or predicted bad domain 424 and the confidence score 426 may be separately generated and provided, or provided in some other form, and/or provided in a different order. The predicted good domain 422 or predicted bad domain 424 and the confidence score 426 may be provided as the output 212 to evaluation circuitry 430 for test and evaluation.

A determination is made as to the correctness of the prediction for a respective domain with the evaluation circuitry 430. The evaluation and output of the correctness of the prediction may be automated, user entered, or some combination thereof. The correctness of the prediction may be provided as a feedback signal 440 into the LSTM encoder circuitry 404. For example, the result is compared against the known legitimacy of the domain (i.e., that the domain is actually known to be good or bad). The result of the comparison may be fed back into the model 211 to update the various weights, activation states, etc. of the LSTM encoder circuitry 404.

Figure 5:
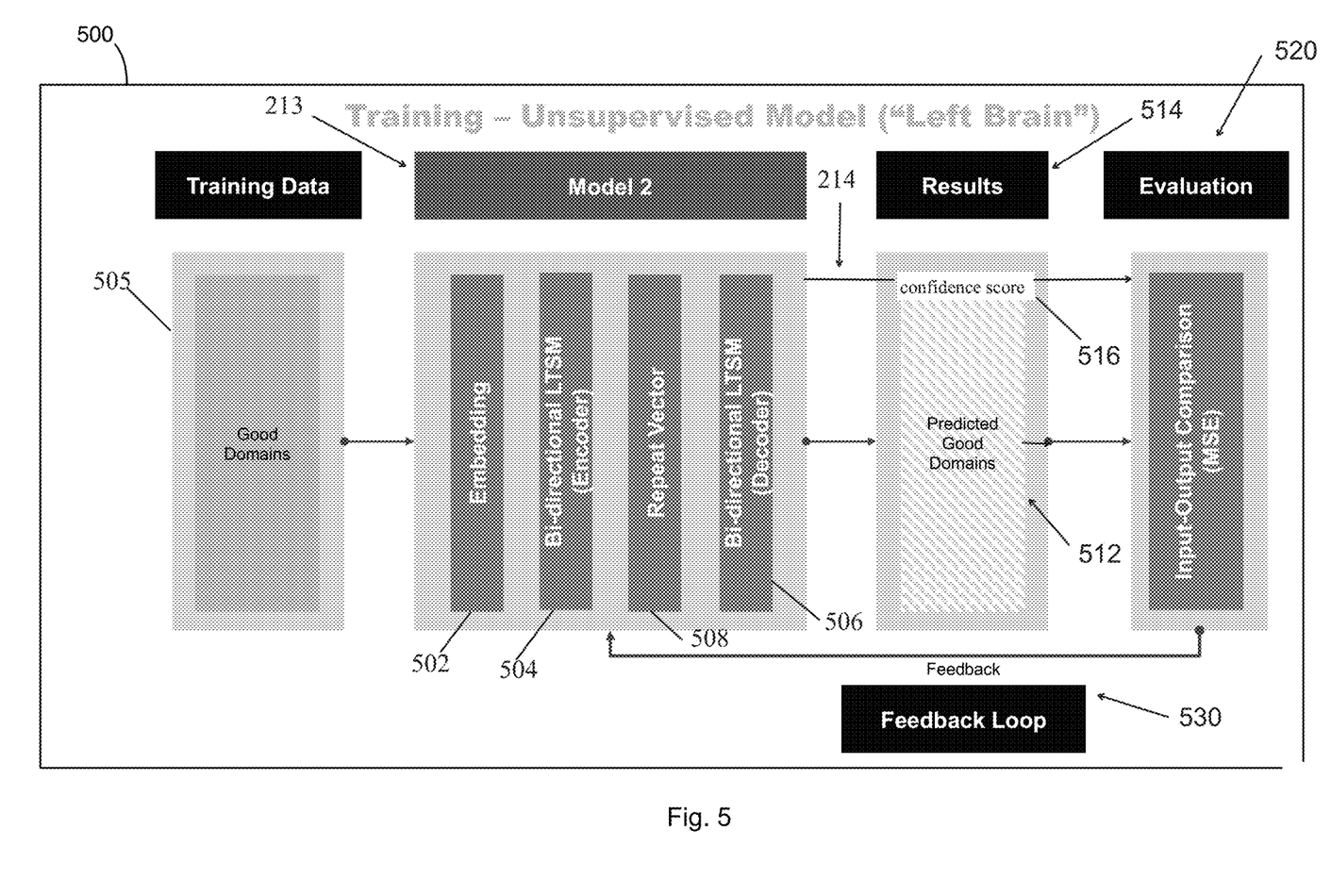
FIG. 5 logically illustrates training of a second model of the MDS.

At operation 310, the second learning model (i.e., left brain) 213 may be trained using, for example known legitimate domains. In some cases, only known legitimate domains are used in training the second learning model 213 so that during later operation the second learning model 213 accurately decodes and encodes only legitimate domains with high confidence. FIG. 5 illustrates exemplary circuitry and logic 500 implemented by the second learning model 213. Referring to FIG. 5, good (legitimate) domains 505 are provided to the second learning model 213. During training of the second learning model 213, the good domains are embedded (i.e., represented as a vector) by the embedding circuitry 502 to facilitate processing within the LSTM RNNs (i.e., the bidirectional LSTM encoder 504 and bidirectional LSTM decoder 506). Repeat vector processing is performed by the repeat vector processing circuitry 508 to connect the bidirectional LSTM encoder 504 and bidirectional LSTM decoder 506 together. Connection of the bidirectional LSTM encoder 504 and bidirectional LSTM decoder 506 provides mapping of the received legitimate domains into code and mapping of the code to generate a predicted domain name.

In the illustrated example, the output 214 of the second learning model 213 is a predicted domain name 512 associated with the received domain name, which is provided as results 514. For example, if the received known legitimate domain was "www.accenture.ABC.com," the predicted domain may be "www.accenture.com." As part of the results 514, the second learning model 213 may generate a confidence score 516 indicative of the confidence (or level of accuracy) that the predicted legitimate domain is correct. A determination is made as to the correctness of the predicted domain with evaluation circuitry 520. The evaluation and output of the correctness of the prediction may be automated, user entered, or some combination thereof. In this example, evaluation circuitry could be used to confirm that the confidence score value 516 should be relatively high for the predicted domain due to the correct prediction. The correctness of the prediction may be provided as a feedback signal 530 into the bidirectional LSTM encoder 504 and bidirectional LSTM decoder 506. The result 514 of the comparison is fed back into the model 213 to update the various weights, activation states, etc. of the LSTM RNNs (i.e., the bidirectional LSTM encoder 504 and bidirectional LSTM decoder 506).

Figure 6:
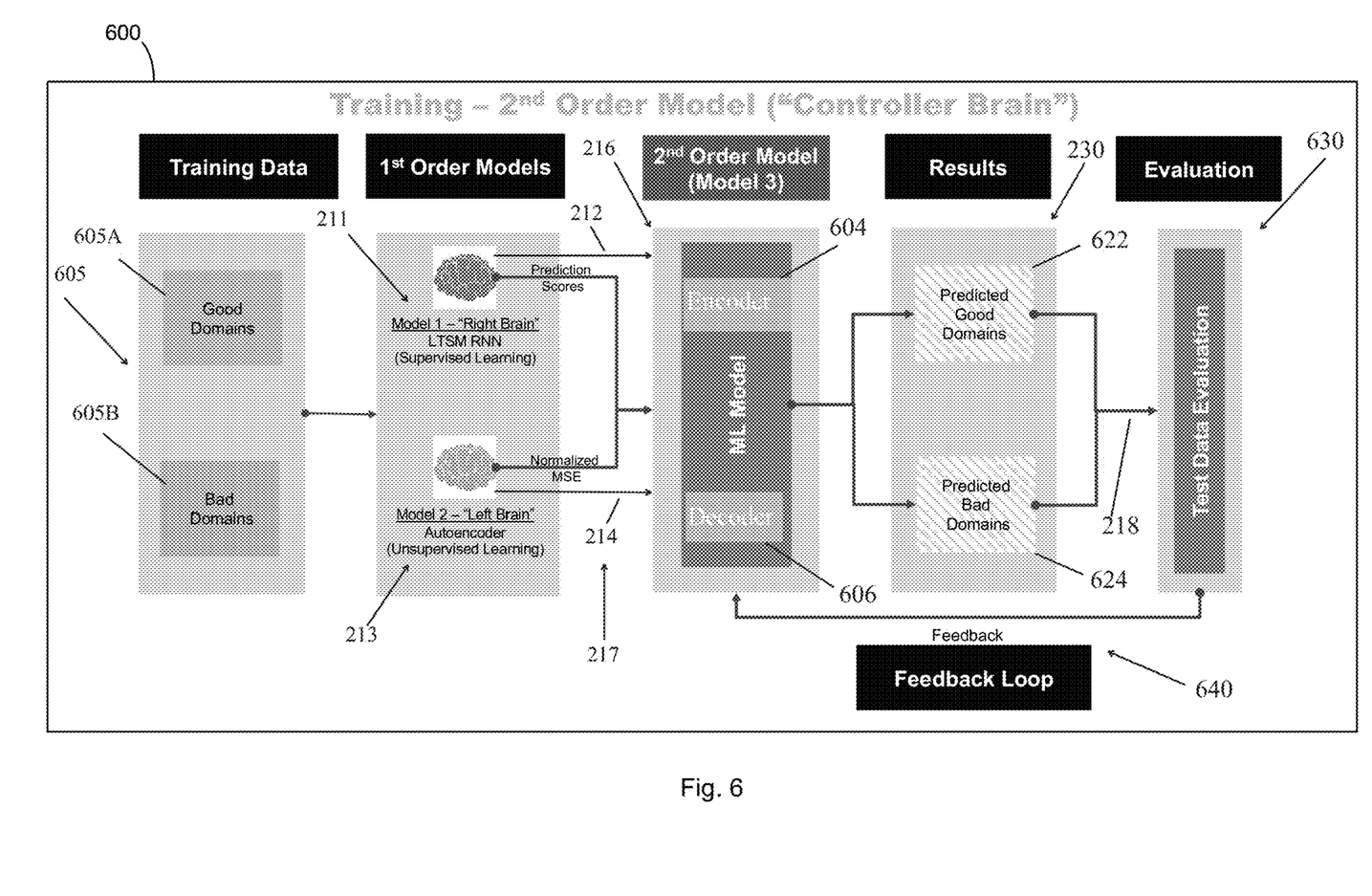
FIG. 6 logically illustrates training of a third model of the MDS.

At operation 315, the third learning model (i.e., controller brain) 216 may be trained using the results of the first and second models 211 and 213 to classify the domain names as either legitimate (i.e., good) and malware-associated (i.e., bad) domains. FIG. 6 illustrates exemplary circuitry and logic 600 implemented by the malware detection system 102. Referring to FIG. 6, the third model 216 is configured to classify the domain name as a legitimate domain name or a malware-associated domain name based on the binary output of the first model 211 and the predicted domain name output by the second model 213. In examples, the third model 216 may be configured to alternatively, or in addition, determine the domain name is a legitimate domain name or a malware-associated domain name using weighting based on first and second confidence values.

For example, based on test data 605 in the form of a received domain name, which may represent one of the legitimate (good) domains 605A or mal-ware associated (bad) domains 605B the first learning model 211 is configured to output a first confidence value 212, or confidence score, indicative of a confidence level of accuracy of the binary output of the first learning model 211, and the second learning model 213 is configured to output a second confidence value 214, or confidence score, indicative of a confidence level of accuracy of the predicted domain name of the second model 213.

The results of the first and second models 211 and 213 and/or one or both respective confidence values 212 and 214 may be provided as the L1 output 217 to the third learning model 216. The third model 216 may classify each received domain name as being a legitimate domain name (predicted good domains) 622 or a malware-associated domain name (predicted bad domains) 624, and provide the prediction as an output 218. The prediction output 218 is compared against the known legitimacy of the domain (i.e., that the domain is actually known to be good or bad) with the evaluation circuitry 630 to provide an indication of correctness of the output 218. The evaluation and output of the correctness of the prediction may be automated, user entered, or some combination thereof. The result of the comparison is fed back into the third learning model 216 as the feedback signal 640 to update the various weights, activation states, etc. of the bidirectional LSTM RNNs, namely a bidirectional LSTM encoder 604 and bidirectional LSTM decoder 606, of the third learning model 216.

Referring to FIGS. 1-6, once the models 211, 213 and 216 are trained, the MDS 102 may be ready to process new domain names received from, for example, the enterprise system 105. The MDS 102 may communicate the results of the processing to the enterprise system 105. An operator of the system may take note that a particular domain name is associated with malware, track down the computer system that sent or received information to/from the domain name, and remove the malware. Automatic actions may also be taken in the enterprise system 105, to, e.g., quarantine the computer system that sent or received information to/from the malware-associated domain name.

Figure 7:
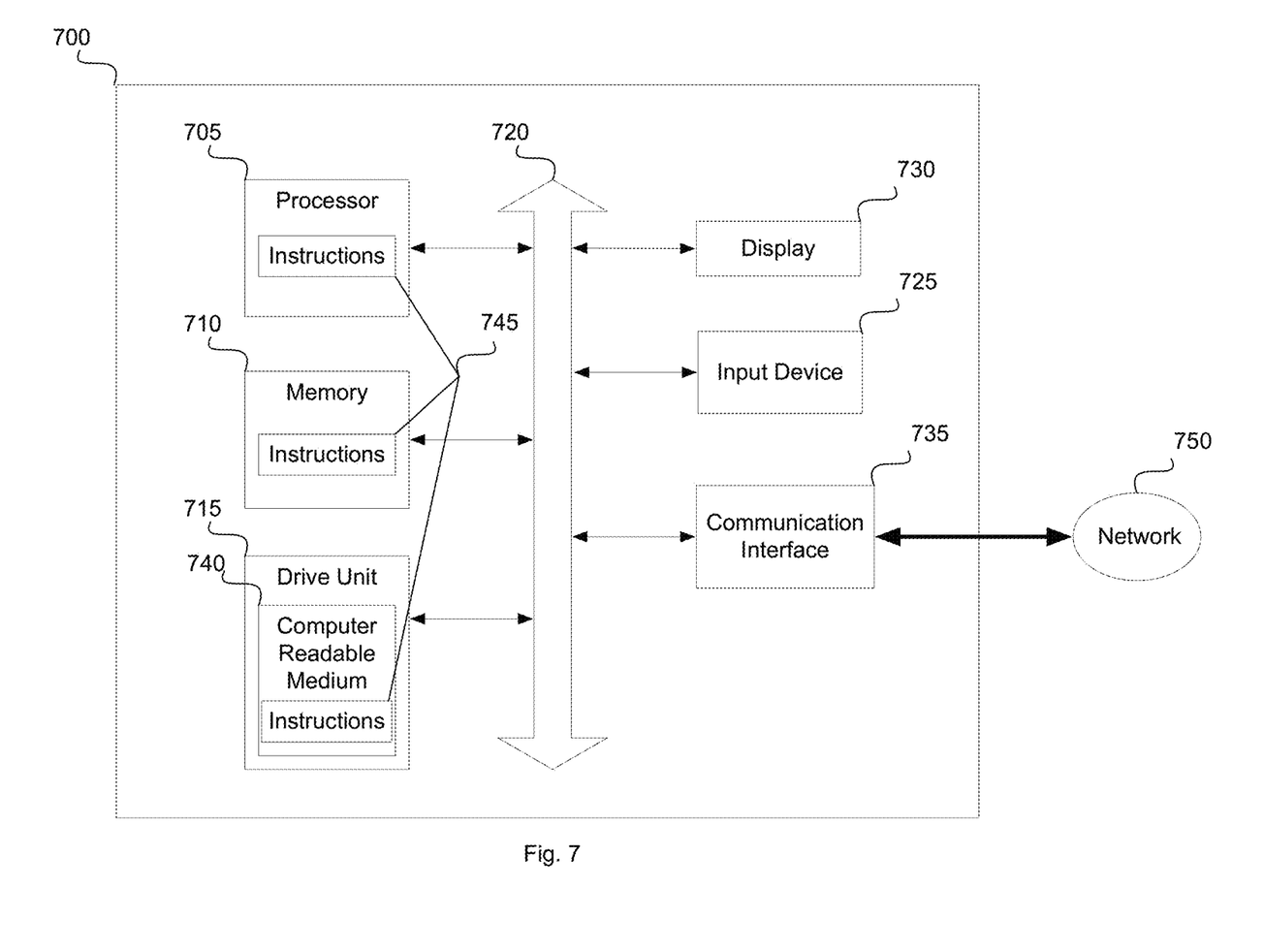
FIG. 7 illustrates an exemplary computer system that may form part of or implement the systems described in the figures or in the following paragraphs.

FIG. 7 illustrates a computer system 700 that may form part of or implement the systems, environments, devices, etc., described above. The computer system 700 may be circuitry that includes a set of instructions 745 that the processor 705 may execute to cause the computer system 700 to perform any of the operations described above. The computer system 700 may be circuitry that operates as a stand-alone device or may be connected, e.g., using a network, to other computer systems or peripheral devices.

In a networked deployment, the computer system 700 may operate in the capacity of a server or as a client computer in a server-client network environment, or as a peer computer system in a peer-to-peer (or distributed) environment. The computer system 700 may also be implemented as or incorporated into various devices, such as a personal computer or a mobile device, capable of executing instructions 745 (sequential or otherwise) causing a device to perform one or more actions. Further, each of the systems described may include a collection of subsystems that individually or jointly execute a set, or multiple sets, of instructions to perform one or more computer operations.

The computer system 700 may include one or more memory devices 710 communicatively coupled to a bus 720 for communicating information. In addition, code operable to cause the computer system to perform operations described above may be stored in the memory 710. The memory 710 may include a random-access memory, read-only memory, programmable memory, hard disk drive or any other type of memory or storage device.

The computer system 700 may include a display 730, such as a liquid crystal display (LCD), a cathode ray tube (CRT), or any other display suitable for conveying information. The display 730 may act as an interface for the user to see processing results produced by processor 705.

Additionally, the computer system 700 may include an input device 725, such as a keyboard or mouse or touchscreen, configured to allow a user to interact with components of system 700.

The computer system 700 may also include a disk or optical drive unit 715. The drive unit 715 may include a computer-readable medium 740 in which the instructions 745 may be stored. The instructions 745 may reside completely, or at least partially, within the memory 710 and/or within the processor 705 during execution by the computer system 700. The memory 710 and the processor 705 also may include computer-readable media as discussed above.

The computer system 700 may include a communication interface 735 to support communications via a network 750. The network 750 may include wired networks, wireless networks, or combinations thereof. The communication interface 735 may enable communications via any number of communication standards, such as 802.11, 802.12, 802.20, WiMAX, cellular telephone standards, or other communication standards.

Accordingly, methods and systems described herein may be realized in hardware, software, or a combination of hardware and software. The methods and systems may be realized in a centralized fashion in at least one computer system or in a distributed fashion where different elements are spread across interconnected computer systems. Any kind of computer system or other apparatus adapted for carrying out the methods described herein may be employed.

The methods and systems described herein may also be embedded in a computer program product, which includes all the features enabling the implementation of the operations described herein and which, when loaded in a computer system, is able to carry out these operations. Computer program as used herein refers to an expression, in a machine-executable language, code or notation, of a set of machine-executable instructions intended to cause a device to perform a particular function, either directly or after one or more of a) conversion of a first language, code, or notation to another language, code, or notation; and b) reproduction of a first language, code, or notation.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

In some examples, each unit, subunit, and/or module of the system may include a logical component. Each logical component may be hardware or a combination of hardware and software. For example, each logical component may include an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each logical component may include memory hardware, such as a portion of the memory, for example, that comprises instructions executable with the processor or other processors to implement one or more of the features of the logical components. When any one of the logical components includes the portion of the memory that comprises instructions executable with the processor, the logical component may or may not include the processor. In some examples, each logical component may just be the portion of the memory or other physical memory that comprises instructions executable with the processor or other processor to implement the features of the corresponding logical component without the logical component including any other hardware. Because each logical component includes at least some hardware even when the included hardware comprises software, each logical component may be interchangeably referred to as a hardware logical component.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While methods and systems have been described with reference to certain embodiments, it will be understood by those skilled in the art that various changes may be made and equivalents may be substituted without departing from the scope of the claims. Therefore, it is intended that the present methods and systems not be limited to the particular embodiment disclosed, but that the disclosed methods and systems include all embodiments falling within the scope of the appended claims.

The invention claimed is:

1. A system for detecting and preventing execution of malware on a target system, the system comprising:

an interface for receiving training data that includes known legitimate domain names and known malware-associated domain names;
a processor in communication with the interface; and
non-transitory computer readable media in communication with the processor that stores instruction code, which when executed by the processor, causes the processor to:
train a first model to classify the domain names in the training data as being legitimate domain names or malware-associated domain names using a supervised learning methodology;
train a second model to predict a correct domain name associated with domain names in the training data using an unsupervised learning methodology, wherein the domain names utilized to train the first model include both legitimate domain names and malware-associated domain names, and the domain names utilized to train the second model include legitimate domain names and not malware-associated domain names;
train a third model to classify the domain names in the training data as being legitimate domain names or malware-associated domain names based on an output of the first learning model and an output of the second learning model;
subsequent to training of the first, second, and third models, receive a new domain name;
process the new domain name through the trained models to determine that the domain name is a legitimate domain name or a malware-associated domain name; and
communicate with the target system based on the processing to thereby facilitate removal of the malware in response to the new domain name being determined as the malware-associated domain name.

2. The system according to claim 1, wherein the domain names utilized to train the third model include both legitimate domain names and malware-associated domain names.

3. The system according to claim 1, wherein the first model utilizes a long short-term memory configured as an encoder to generate as the output of the first model a binary output indicating a prediction that the new domain name is a predicted good domain or a predicted bad domain.

4. The system according to claim 1, wherein the second model implements an autoencoder that includes a first long short-term memory configured as an encoder to map the new domain name comprising a plurality of characters and a second-long short-term memory configured as a decoder to construct a predicted domain name comprising a plurality of characters, the predicted domain name provided as the output of the second model.

5. The system according to claim 1, wherein the output of the first model is a binary output indicating a prediction that the new domain name is a predicted good domain or a predicted bad domain, and the output of the second model being a predicted domain name comprising a plurality of characters constructed by the second model based on the new domain name.

6. The system according to claim 5, wherein the third model is configured to classify the new domain name as a legitimate domain name or a malware-associated domain name based on the binary output of the first model and the predicted domain name output by the second model.

7. The system accordingly to claim 6, wherein the first model is configured to output a first confidence value indicative of a confidence level of accuracy of the binary output of the first model, the second model is configured to output a second confidence value indicative of a confidence level of accuracy of the predicted domain name output of the second model, and the third model is configured to classify the new domain name as the legitimate domain name or the malware-associated domain name using weighting based on the first and second confidence values.

8. A method for detecting and preventing execution of malware on a target system, the method comprising:
receiving training data that includes known legitimate domain names and known malware-associated domain names;
training a first model to classify the domain names in the training data as being legitimate domain names or malware-associated domain names using a supervised learning methodology, wherein training the first model to classify the domain names in the training data comprises providing as inputs to the first model both legitimate domain names and malware-associated domain names as the training data;
training a second model to predict a correct domain name associated with legitimate domain names in the training data using an unsupervised learning methodology, wherein training the second model to predict the correct domain name comprises providing as inputs to the second model as the training data legitimate domain names and omitting provision of the malware-associated domain names;
training a third model to classify the domain names in the training data as being legitimate domain names or malware-associated domain names based on an output of the first learning model and an output of the second learning model;
subsequent to training of the first, second, and third models, receiving a new domain name;
processing the new domain name through the trained models to determine that the domain name is a legitimate domain name or a malware-associated domain name; and
communicating with the target system based on the processing to thereby facilitate removal of the malware from the target system.

9. The method according to claim 8, wherein training the third model to classify the domain names in the training data comprises providing as inputs to the third model both legitimate domain names and malware-associated domain names.

10. The method according to claim 8, wherein the first model utilizes a long short-term memory configured as an encoder, and wherein processing the new domain name through the trained models comprises generating as the output of the long short-term memory configured as an encoder a binary output indicating a prediction that the new domain name is a predicted good domain or a predicted bad domain.

11. The method according to claim 10, wherein the second model implements an autoencoder that includes a first long short-term memory configured as an encoder and a second-long short-term memory configured as a decoder and wherein processing the new domain name through the trained models comprises mapping, with the first long short-term memory configured as an encoder, the new domain name comprising a plurality of characters and constructing, with the second-long short-term memory configured as a decoder, a predicted domain name comprising a plurality of characters, the predicted domain name provided as the output of the second model.

12. The method according to claim 8, wherein processing the new domain name through the trained models comprises:
- outputting, by the first model, a binary output indicating a prediction that the new domain name is a predicted good domain or a predicted bad domain and a first confidence value indicative of a confidence level of accuracy of the binary output;
- outputting, by the second model, a predicted domain name comprising a plurality of characters constructed by the second model based on the new domain name and a second confidence value indicative of a confidence level of accuracy of the predicted domain name; and
- classifying, with the third model, the domain name as the legitimate domain name or the malware-associated domain name using weighting based on the first confidence value and the second confidence value.

13. A non-transitory computer readable media that stores instruction code for detecting and preventing execution of malware on a target system, the instruction code being executable by a machine for causing the machine to:
- receive training data that includes known legitimate domain names and known malware-associated domain names;
- train a first model to classify the domain names in the training data as being legitimate domain names or malware-associated domain names using a supervised learning methodology, wherein the domain names utilized to train the first model include both legitimate domain names and malware-associated domain names;
- train a second model to predict a predicted domain name associated with domain names in the training data using an unsupervised learning methodology, the domain names utilized to train the second model include legitimate domain names and not malware-associated domain names;
- train a third model to classify the domain names in the training data as being legitimate domain names or malware-associated domain names based on an output of the first learning model and an output of the second learning model;
- subsequent to training of the first, second, and third models, receive a new domain name;
- process the new domain name through the trained models to determine that the domain name is a legitimate domain name or a malware-associated domain name; and
- communicate with the target system based on the processing to thereby facilitate removal of the malware from the target system.

14. The non-transitory computer readable media according to claim 13, wherein the domain names utilized to train the third model include both legitimate domain names and malware-associated domain names.

15. The non-transitory computer readable media according to claim 13, wherein the first model utilizes a long short-term memory configured as an encoder.

16. The non-transitory computer readable media according to claim 13, wherein the second model implements an autoencoder that includes a first long short-term memory configured as an encoder and a second-long short-term memory configured as a decoder.

* * * * *